US007468511B2

(12) United States Patent
Belford

(10) Patent No.: US 7,468,511 B2
(45) Date of Patent: Dec. 23, 2008

(54) FAIMS ELECTRODES WITH LATERAL ION FOCUSING

(75) Inventor: Michael W. Belford, Santa Clara, CA (US)

(73) Assignee: Thermo Finnigan, LLC, San Jose, CA (US)

( * ) Notice: Subject to any disclaimer, the term of this patent is extended or adjusted under 35 U.S.C. 154(b) by 255 days.

(21) Appl. No.: 11/451,636

(22) Filed: Jun. 13, 2006

(65) Prior Publication Data

US 2008/0067366 A1 Mar. 20, 2008

(51) Int. Cl.
*B01D 59/44* (2006.01)
*H01J 49/40* (2006.01)
*H01J 49/28* (2006.01)
*H01J 49/00* (2006.01)

(52) U.S. Cl. ....................... 250/290; 250/281; 250/282; 250/293

(58) Field of Classification Search ......... 250/281–283, 250/286, 288, 290–294
See application file for complete search history.

(56) References Cited

U.S. PATENT DOCUMENTS 6,753,533 B2 * 6/2004 Mita ...................... 250/396 R
6,770,875 B1 * 8/2004 Guevremont et al. ....... 250/288
7,034,289 B2 * 4/2006 Guevremont et al. ....... 250/288
7,045,778 B2 * 5/2006 Guevremont et al. ....... 250/288
7,112,788 B2 * 9/2006 Guevremont et al. ....... 250/294
7,223,967 B2 * 5/2007 Guevremont et al. ....... 250/288
7,274,014 B2 * 9/2007 Guevremont et al. ....... 250/287
7,351,960 B2 * 4/2008 Belford ...................... 250/288
7,417,225 B2 * 8/2008 Guevremont et al. ....... 250/287
2003/0150984 A1 * 8/2003 Guevremont et al. ....... 250/281
2005/0167587 A1 * 8/2005 Guevremont et al. ....... 250/294
2005/0178964 A1 * 8/2005 Guevremont et al. ....... 250/294
2006/0060773 A1 * 3/2006 Guevremont et al. ....... 250/290
2006/0151694 A1 * 7/2006 Guevremont et al. ....... 250/292
2006/0237643 A1 * 10/2006 Guevremont et al. ....... 250/292
2006/0255264 A1 * 11/2006 Belford ...................... 250/291
2008/0067366 A1 * 3/2008 Belford ...................... 250/294

FOREIGN PATENT DOCUMENTS

WO WO 01/69216 A2 9/2001
WO WO 01/69217 A2 9/2001
WO WO 03/067236 A2 8/2003

* cited by examiner

*Primary Examiner*—Bernard E Souw
(74) *Attorney, Agent, or Firm*—Freedman & Associates; Thomas F. Cooney

(57) ABSTRACT

A FAIMS cell including one of side-to-side cylindrical geometry electrodes and stacked-plate electrodes is adapted with a medial surface feature for focusing ions along a lateral direction within an ion separation region of the FAIMS cell. The medial surface feature is provided as one of a recessed channel within an electrode surface and a protruding ridge extending from an electrode surface. The medial surface feature is aligned with a defined aggregate direction of ion travel within the ion separation region for focusing ions along the lateral direction in opposition to the tendency of ions to spread out as a result of space charge repulsion, ion-ion repulsive forces, diffusion and gas flows. The electrical field and fluid dynamic effects produced by the medial surface feature beneficially affect ion transmission efficiency through the FAIMS cell.

27 Claims, 11 Drawing Sheets

FAIMS ELECTRODES WITH LATERAL ION FOCUSING

FIELD OF THE INVENTION

The instant invention relates generally to High Field Asymmetric Waveform Ion Mobility Spectrometry (FAIMS), and more particularly to electrode geometries for FAIMS cells.

BACKGROUND OF THE INVENTION

High Field Asymmetric Waveform Ion Mobility Spectrometry (FAIMS) is a technology that is capable of separating gas-phase ions at atmospheric pressure. In FAIMS the ions are introduced into an analyzer region across which an radio frequency (RF) waveform is applied such that the ions are alternately subjected to high and low electric fields. The waveform is asymmetric; the high field is applied for one time unit followed by an opposite-polarity low field component applied for twice as long. The field-dependent change in the mobility of the ions causes the ions to drift towards the walls of the analyzer region. Since the dependence of ion mobility on electric field strength is compound specific, this leads to a separation of the different types of ions one from the other, and is referred to as the FAIMS separation. In order to transmit an ion of interest through FAIMS, an appropriate DC voltage is applied to compensate for the drift of the ion of interest toward the analyzer wall. By varying the compensation voltage, different ions are selectably transmitted through the FAIMS device.

A number of different electrode geometries have been described for use with FAIMS, including concentric cylindrical electrodes with a domed inner electrode (d-FAIMS), concentric cylindrical electrodes in a side-to-side orientation, and stacked plate geometries with either flat or curved electrode plates. In the d-FAIMS geometry the ions are separated as they travel along the length of the electrodes. The ions become focused into a band extending around the inner electrode due to focusing fields that exists within the space between the inner and outer cylindrical electrodes. Advantageously the focusing effect extends around the domed terminus of the inner electrode, such that the ions are concentrated into a narrow beam prior to extraction. However, the d-FAIMS geometry tends to be rather bulky and ion residence times are relatively long.

The side-to-side geometry is more compact compared to the d-FAIMS geometry, since the ions travel circumferentially within the space between the inner and outer cylindrical electrodes. Unfortunately, typically there is no force to prevent the ions from spreading out laterally along the length of the electrodes as they travel through the ion separation region between the electrodes. Accordingly, ion transmission efficiency is low compared to the d-FAIMS geometry. One prior art approach has been to use a segmented outer or inner electrode, as described in U.S. Pat. No. 7,034,289 which issued on Apr. 25, 2006 in the name of Guevremont et al., the entire contents of which is herein incorporated by reference. The segmented electrode supports creation of a potential gradient along the lateral direction in a side-to-side FAIMS, for directing ions in a direction that is opposite the lateral spreading out behavior. Unfortunately, the complexity of the segmented electrode system, including associated voltage supplies and controllers, adds to the complexity and bulk of this otherwise compact design.

A similar problem is encountered in stacked plate geometry FAIMS devices. In this case, ions spread out laterally toward the edges of the plates as they travel through the ion separation region between the ion inlet and the ion outlet. One prior art solution to this problem involves modifying the end edges of a central electrode plate, so as to direct ions toward the central axis of the electrode plate immediately prior to the ions being extracted via the ion outlet orifice, as described in U.S. Pat. No. 6,806,466 which issued on Oct. 19, 2004 in the name of Guevremont et al., the entire contents of which is herein incorporated by reference. Unfortunately, the ions still spread out laterally during the time they spend within the ion separation region between the electrode plates. Accordingly, ion losses still occur as a result of collisions with a surface at the lateral boundaries of the ion separation region. There is no force that opposes the lateral spreading out of the ions within the ion separation region.

There is a need for FAIMS electrodes that achieve high ion transmission in a compact package.

SUMMARY OF THE INVENTION

According to an aspect of the instant invention there is provided a FAIMS cell, comprising: a first electrode comprising a first electrode surface; a second electrode comprising a second electrode surface, the second electrode surface disposed in a spaced-apart facing arrangement relative to the first electrode surface so as to define an ion separation region therebetween, the ion separation region extending along a lateral direction between first and second opposite lateral boundaries thereof, the second electrode surface adapted with a medial surface feature extending along a defined direction of ion travel that is approximately perpendicular to the lateral direction, the medial surface feature for supporting ion focusing along the lateral direction; and, a voltage source for applying a radio frequency (RF) asymmetric waveform (DV) and a direct current compensation voltage (CV) to at least one of the first electrode and the second electrode.

According to another aspect of the instant invention, provided is a FAIMS cell, comprising: an inner electrode having an outer surface comprising a first cylindrical surface portion, a second cylindrical surface portion, and a surface perturbation defined therebetween, the surface perturbation forming a channel along the perimeter of the inner electrode, the channel being recessed with respect to both the first cylindrical surface portion and the second cylindrical surface portion; an outer electrode having a generally cylindrical inner surface that is disposed in a spaced-apart and facing arrangement relative to the outer surface of the inner electrode for defining an ion separation region therebetween; and, a voltage source for applying a radio frequency (RF) asymmetric waveform (DV) and a direct current compensation voltage (CV) to at least one of the inner electrode and the outer electrode for establishing an electric field therebetween.

According to yet another aspect of the instant invention, provided is a FAIMS electrode comprising a one-piece electrode body having one of a substantially cylindrical geometry and a substantially flat-plate geometry, the one-piece electrode body having a generally uniform surface contour along a lateral direction that is defined between two opposite edges of the one-piece electrode body, a medial portion of the generally uniform surface contour being one of recessed relative to adjacent portions of the generally uniform surface contour so as to define a channel that is aligned along a defined aggregate direction of ion travel and protruding relative to adjacent portions of the generally uniform surface contour so as to define a ridge that is aligned along the defined aggregate direction of ion travel, the medial portion of the generally uniform surface contour for focusing ions along the lateral direction.

BRIEF DESCRIPTION OF THE DRAWINGS

Exemplary embodiments of the invention will now be described in conjunction with the following drawings, in which similar reference numerals designate similar items.

DESCRIPTION OF EMBODIMENTS OF THE INSTANT INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1A:
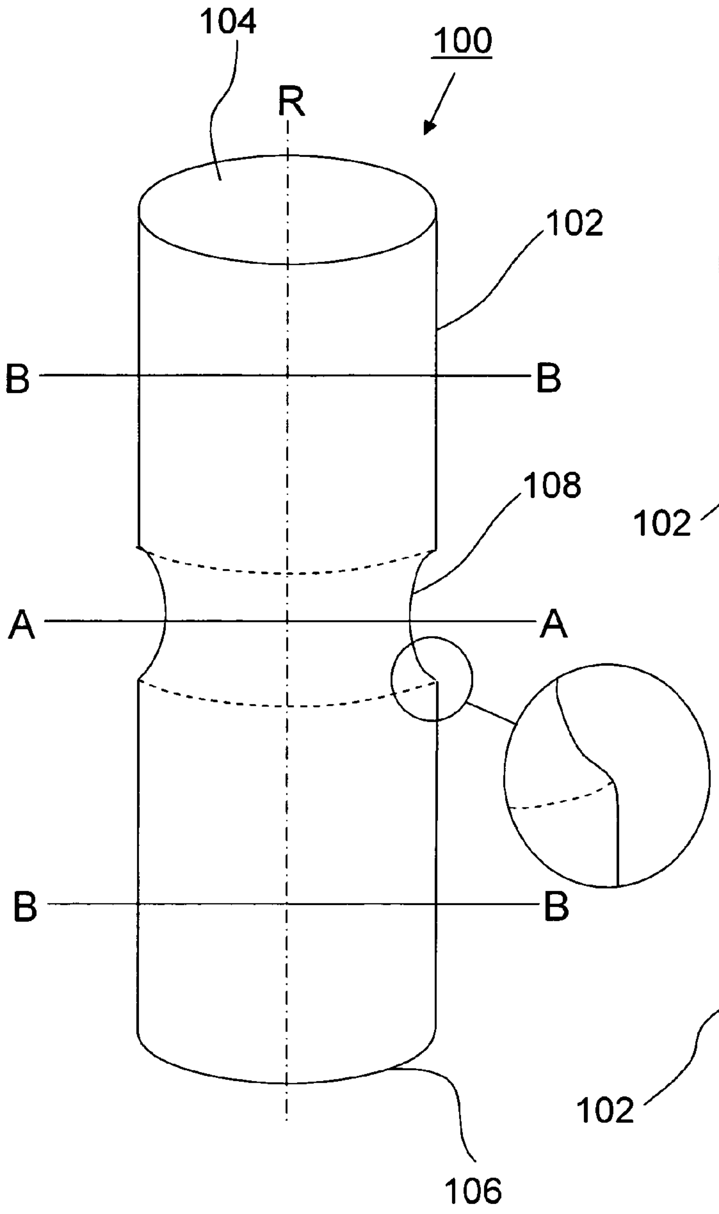
FIG. 1*a* is a simplified side view in partial elevation of a FAIMS inner electrode of right circular cylindrical geometry and adapted with a medial surface feature according to an embodiment of the instant invention.

Referring to FIG. 1*a,* shown is a simplified side view in partial elevation of a FAIMS inner electrode of right circular cylindrical geometry and adapted with a medial surface feature according to an embodiment of the instant invention. In the specific example that is shown in FIG. 1*a,* the inner electrode 100 is rotationally symmetric about a lateral axis "R". The outer surface contour 102 of the inner electrode 100 is generally uniform along the lateral direction between opposite ends 104 and 106 of the electrode 100. As shown in FIG. 1*a,* the outer surface contour 102 is adapted with a medial surface feature 108 for focusing ions along the lateral direction between the opposite ends 104 and 106. In particular, the medial surface feature 108 is provided in the form of a recessed channel extending around the perimeter of the inner electrode 100. As is shown in the inset, preferably the recessed channel is smoothly continuous with adjacent portions of the outer surface 102, absent a sharp corner therebetween. Eliminating sharp corners reduces the chance of electrical discharge occurring between the inner electrode 100 and adjacent electrode surfaces (not shown). The medial surface feature 108 is defined intermediate the opposite ends 104 and 106 of the inner electrode 100. In FIG. 1*a* the medial surface feature 108 is shown approximately halfway between the opposite ends 104 and 106 of the inner electrode 100. Alternatively, the medial surface feature 108 is offset closer to one end than the other of the inner electrode 100. Significantly, the medial surface feature 108 is substantially aligned with not illustrated ion inlet and ion outlet orifices when in an assembled condition, as is discussed below in greater detail.

By way of a specific and non-limiting example, the diameter of the outer surface 102 of electrode 100 is 13 mm (0.512 inches) and the diameter of the medial surface feature 108 is 12 mm (0.472 inches). Accordingly, the medial surface feature 108 is approximately 0.5 mm (0.020 inches) deep in FIG. 1*a.* Furthermore, the length of the inner electrode 100 is 25 mm (0.984 inches) not including terminal mounting portions (not shown) at either end, which are provided for being mounted within a not illustrated electrically insulating support material. In this specific example, the width of the medial surface feature 108 is approximately 6 mm (0.236 inches). It is to be understood that the specific dimensions that are outlined above are provided for illustrative purposes only, and that some optimization may be required for different sized electrodes, for electrodes of different geometry, for specialized applications or to obtain desired results, etc. Furthermore, FIG. 1*a* is not drawn to scale. The dimensions of the medial surface feature 108 have been exaggerated for improved clarity in the drawings.

In FIG. 1*a,* the recessed channel is shown with approximately uniform depth and width around the perimeter of the inner electrode 100. Optionally, the depth and/or width may vary around the perimeter of the inner electrode 100. For instance, the depth and width may be greatest at a point that is for being aligned with a not illustrated ion inlet orifice, and one or both of the depth and width may decrease symmetrically in both directions around the perimeter of inner electrode 100 toward a point that is aligned with a not illustrated ion outlet orifice. In this way, ions become focused more closely together as ion separation occurs during the time the ions travel between the ion inlet orifice and the ion outlet orifice. Further optionally, the recessed channel may not be continuous around the perimeter of the inner electrode 100. For instance, the recessed channel may be interrupted, such that it extends symmetrically around the perimeter of inner electrode 100 in both directions between first and second diametrically opposite non-recessed portions of the outer surface 102. The non-recessed portions of the outer surface 102 are for being aligned one each with ion inlet and ion outlet orifices of a not illustrated outer electrode. In this way, the recessed channel does not perturb the electric fields adjacent the ion inlet orifice and the ion outlet orifice to a great extent, such that ions are introduced and extracted via the inlet and outlet orifices, respectively, with fewer losses to the electrode surfaces. Further optionally, the inner electrode may have a geometry other than right circular. For instance, the inner electrode may be of generally elliptic cylindrical geometry. Other cylindrical geometries may also be envisaged. Preferably, ion flow is symmetric in both directions around the inner electrode.

Further optionally, the inner electrode 100 may be adapted with a temperature controller, for controllably heating and/or cooling the inner electrode 100. For instance, a conduit or channel may be provided along a portion of the length of the interior of the inner electrode 100 for supporting a flow of a heat-exchange fluid within the inner electrode 100. Alternatively, an electronic heating and/or cooling element may be provided within the conduit or channel. Of course, provision to shield the electronic heating and/or cooling element is preferably included in order to prevent interferences with the generation of FAIMS electric fields.

Figure 1B:
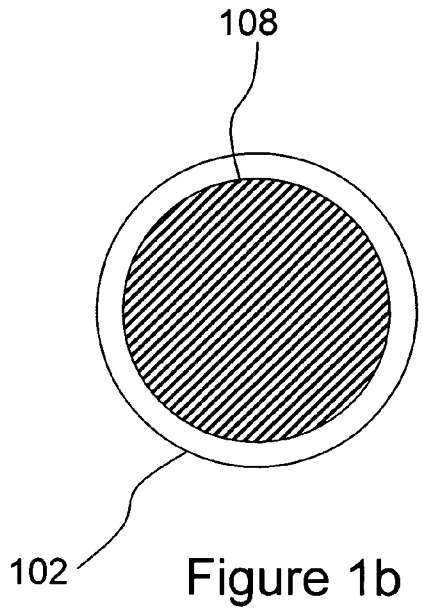
FIG. 1*b* is a simplified cross-sectional end view taken along the line A-A within the medial surface feature of the electrode of FIG. 1*a;*

Referring now to FIG. 1*b,* shown is a simplified cross-sectional end view taken along the line A-A within the medial surface feature of the electrode of FIG. 1*a*. In this specific example, the outer surface 102 is circular in cross-section. Furthermore, the outer surface of the medial surface feature 108 also is circular in cross-section.

Figure 1C:
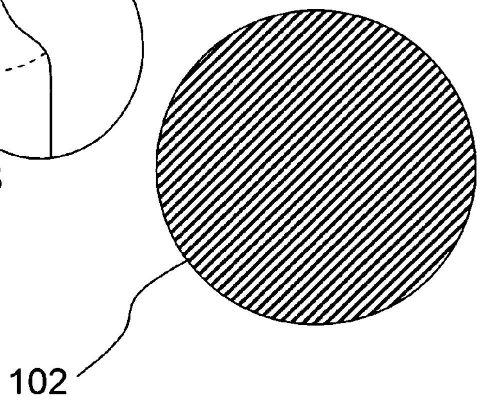
FIG. 1*c* is a simplified cross-sectional end view taken along either one of the lines B-B outside the medial surface feature of the electrode of FIG. 1*a;*

Referring now to FIG. 1*c,* shown is a simplified cross-sectional end view taken along either one of the lines B-B outside the medial surface feature of the electrode of FIG. 1*a*. As discussed above, the outer surface 102 is circular in cross-section.

Figures 2A, 2B:
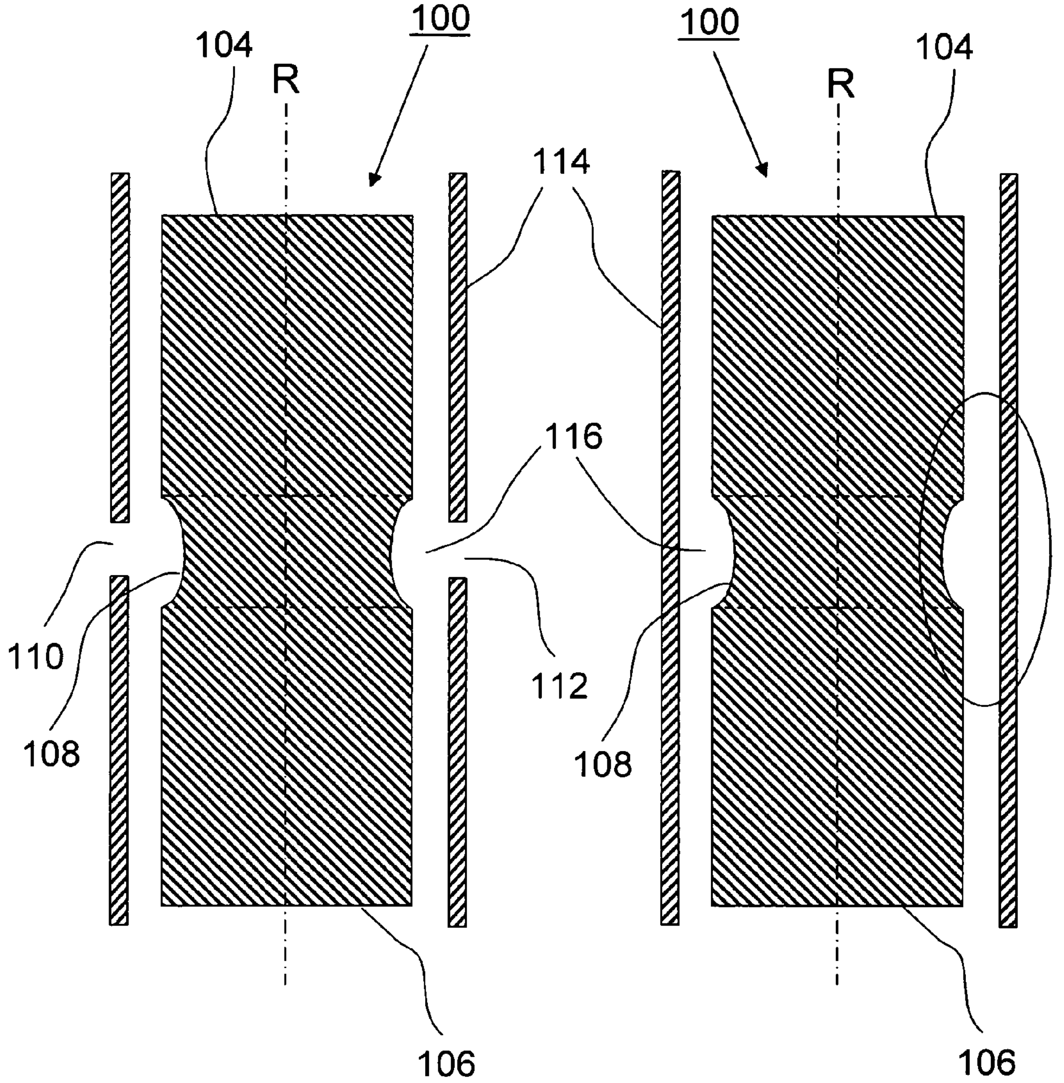
FIG. 2*a* is a simplified cross-sectional side view of a FAIMS electrode assembly including the electrode of FIG. 1*a* and an outer cylindrical electrode, taken within a plane passing through ion inlet and ion outlet orifices defined within the outer cylindrical electrode.
FIG. 2*b* is a simplified cross-sectional side view of the electrode assembly of FIG. 2*a,* after rotation by 90° about the axis "R"

Referring now to FIG. 2*a,* shown is a simplified cross-sectional side view of a FAIMS electrode assembly including the inner electrode of FIG. 1*a* and an outer cylindrical electrode, taken within a plane passing through ion inlet and ion outlet orifices defined within the outer cylindrical electrode. The ion inlet orifice 110 and the ion outlet orifice 112 of the outer electrode 114 are aligned along the lateral direction with the medial surface feature 108 of inner electrode 100. Ions passing through the ion inlet orifice 110 enter an ion separation region 116 that is defined between the inner electrode 100 and the outer electrode 114. The ion separation region 116 extends in both directions around the inner electrode 100 to the ion outlet orifice 112. The ion separation region 116 also extends laterally along the inner electrode 100. Ions move through the ion separation region 116 along a defined aggregate direction of ion travel between the ion inlet orifice 110 and the ion outlet orifice 112. More specifically, an aggregate direction of ion travel is defined in both directions around of the inner electrode. In order to obtain similar separation results in both directions around the inner electrode, the electrode assembly is assembled such that the aggregate direction of ion travel in both directions around the inner electrode 100 are symmetric.

Referring now to FIG. 2*b,* shown is a simplified cross-sectional side view of the electrode assembly of FIG. 2*a,* after rotation by 90° about the axis "R". FIG. 2*b* illustrates the ion separation region 116 extending around the inner electrode 100.

Referring now to FIGS. 2*a* and 2*b,* it is known that the curved electrode surfaces of the inner electrode 100 and outer electrode 114 result in the formation of electric fields that focus different types of ions at different radial distances between the two electrode surfaces. An ion of interest is focused into a narrow band as a result of an appropriate CV and DV combination being applied to one or more of the inner electrode 100 and the outer electrode 114. This narrow band actually has a thickness, with high ion density near a central region thereof and lower ion density toward either edge. Unfortunately, typically in a side-to-side FAIMS device there is no force acting in opposition to tendency of the ions to spread out along the lateral direction. This tendency is the result of gas flows, space-charge repulsion, ion-ion repulsive forces, diffusion, etc. Ions that are laterally displaced away from the ion outlet orifice by more than a threshold amount are not detected. Accordingly, ion transmission efficiency is reduced. Advantageously, the medial surface feature 108 in the inner electrode 100 of FIGS. 1*a* through 2*b* focuses ions that are near the edges of the medial surface feature toward the center of the medial surface feature. In this context, focusing means directing the ions along the lateral direction in opposition to their tendency to spread out along the lateral direction. In this way, more ions are retained within a portion of the ion separation region 116 that is effectively sampled via the ion outlet orifice. Furthermore, the recessed nature of the medial surface feature creates an enlarged volume to accommodate ions, and also directs the flow of gas along a desired path between the ion inlet and the ion outlet.

Figure 3:
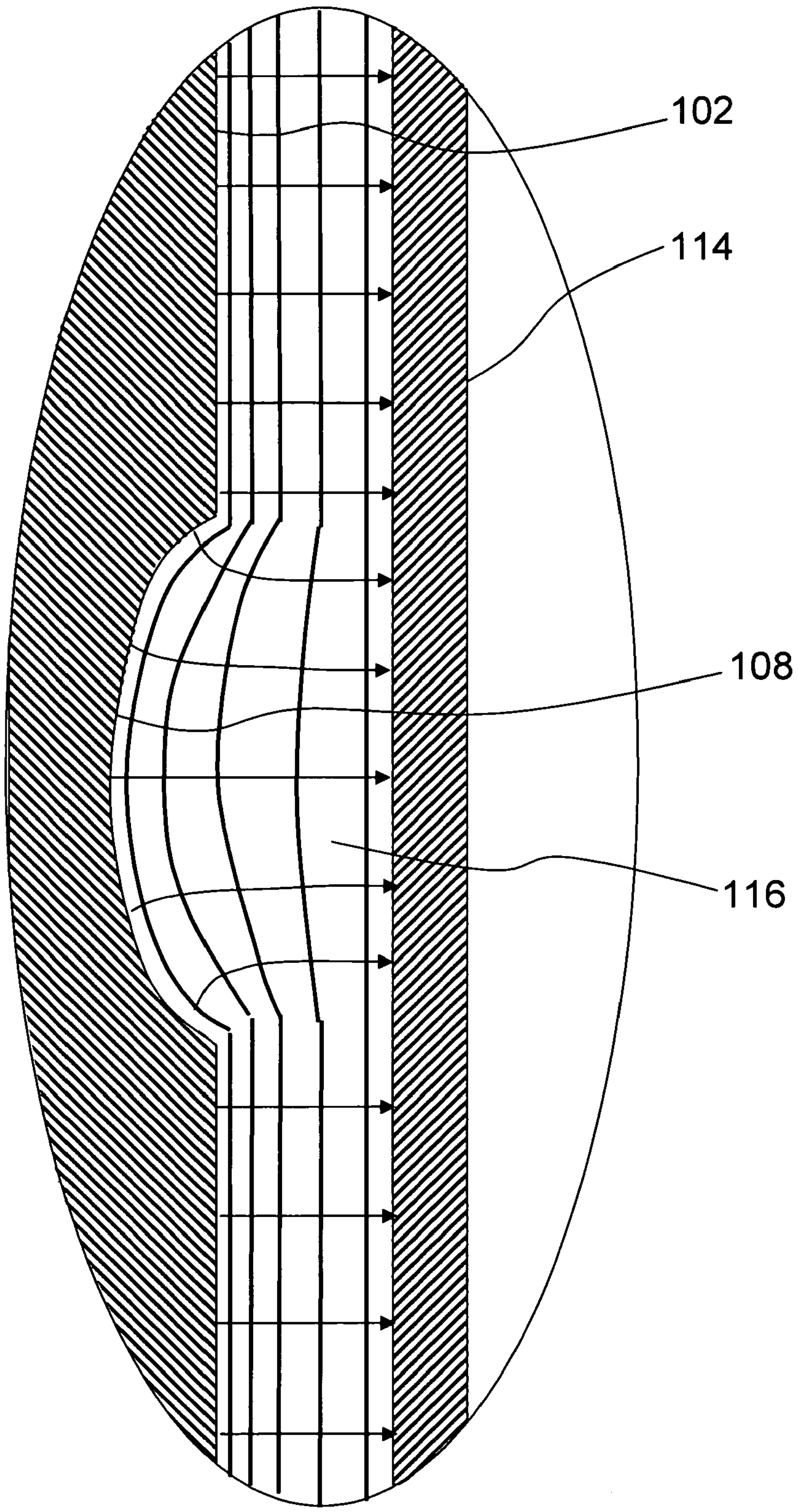
FIG. 3 is a detail view of a portion of the electrode assembly of FIG. 2*b;*

Referring now to FIG. 3, shown is a detail view of a portion of the electrode assembly of FIG. 2*b*. In FIG. 3, the substantially vertical lines are equipotential lines arising from the applied voltages between the outer surface 102 of electrode 100 and the inner surface of electrode 114. FIG. 3 is a "snapshot" showing the equipotential lines during, for instance, the high voltage portion of the asymmetric waveform. Points along each equipotential line are at the same potential. During the opposite polarity, low voltage portion of the asymmetric waveform the equipotential lines have the same geometry," the difference being that the values that are assigned to the equipotential lines are different. Electric field lines are shown with closed arrowheads, the electric field lines crossing the equipotential lines at right angles. Of course, during the opposite polarity, low voltage portion of the asymmetric waveform, the direction of the electric field lines simply is reversed.

The electric field that is formed within the portion of the ion separation region 116 adjacent to the medial surface feature 108 acts to focus ions laterally, along a direction toward the central plane of the medial surface feature. It is believed that in addition to electric field effects, fluid dynamic effects may also play a role in focusing the ions along the lateral direction. Since the central plane of the medial surface feature 108 is laterally aligned with the ion inlet orifice 110 and the ion outlet orifice 112 of the outer electrode 114, some of the ions that otherwise would be lost to collisions with an electrode surface are confined laterally and instead pass through the ion separation region 116 and out through the ion outlet orifice 112.

Figure 4A:
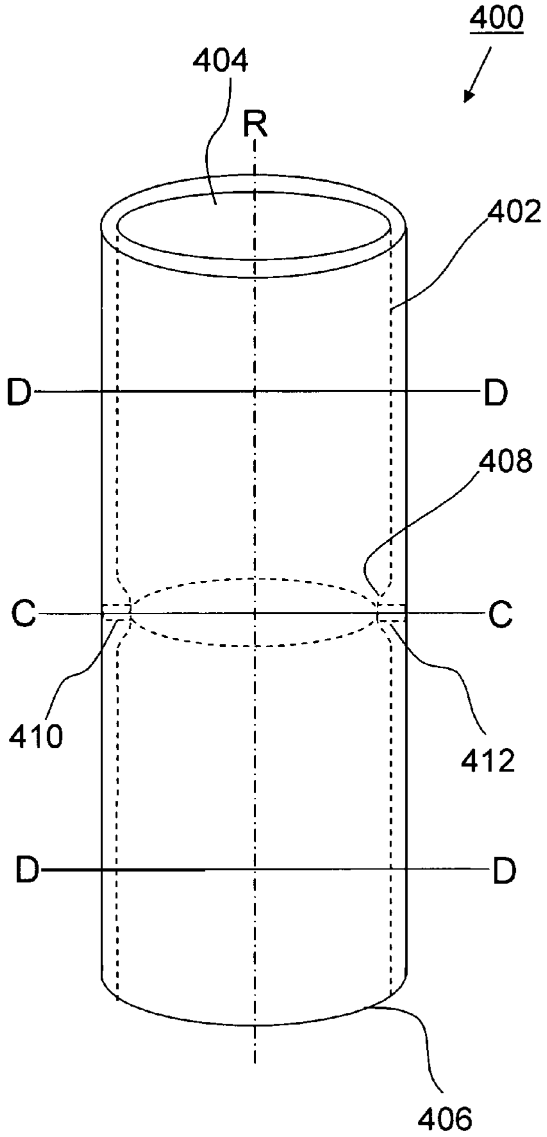
FIG. 4*a* is a simplified side view in partial elevation of a FAIMS outer electrode of right circular cylindrical geometry and adapted with a medial surface feature according to an embodiment of the instant invention.

Referring now to FIG. 4*a,* shown is a simplified side view in partial elevation of a FAIMS outer electrode of right circular cylindrical geometry and adapted with a protruding ridge according to another embodiment of the instant invention. In the specific example that is shown in FIG. 4*a,* the outer electrode 400 is rotationally symmetric about a lateral axis “R”. The inner surface contour 402 of the outer electrode 400 is generally uniform along the lateral direction between opposite ends 404 and 406 of the electrode 400. The inner surface contour 402 is adapted with a medial surface feature 408 for focusing ions along the lateral direction between the opposite ends 404 and 406. In particular, the medial surface feature 408 is provided in the form of a protruding ridge, which extends inwardly around the perimeter of the outer electrode 400. Preferably the protruding ridge is smoothly continuous with adjacent portions of the inner surface 402, absent a sharp corner therebetween. Eliminating sharp corners reduces the chance of electrical discharge occurring between the outer electrode 400 and adjacent electrode surfaces (not shown). The medial surface feature 408 is defined intermediate the opposite ends 404 and 406 of the outer electrode 400. In FIG. 4*a* the medial surface feature 408 is shown approximately halfway between the opposite ends 404 and 406 of the outer electrode 400. Alternatively, the medial surface feature 408 is offset closer to one end than the other of the outer electrode 400. Significantly, the medial surface feature 408 is substantially aligned with ion inlet orifice 410 and ion outlet orifice 412 when in an assembled condition, as is discussed below in greater detail.

In FIG. 4*a,* the protruding ridge is shown with approximately uniform height and width around the perimeter of the outer electrode 400. Optionally, the height and/or width may vary around the perimeter of the outer electrode 400. Further optionally, the protruding ridge may not be continuous around the perimeter of the outer electrode 400. For instance, the protruding ridge may be interrupted, such that it tapers down toward the ion inlet orifice 410 and toward the ion outlet orifice 412. In this way, the protruding ridge does not perturb the electric fields adjacent the ion inlet orifice 410 and the ion outlet orifice 412 to a great extent, such that ions are introduced and extracted via the inlet orifice 410 and outlet orifice 412, respectively, with fewer losses to the electrode surfaces. Further optionally, the outer electrode may not be of right circular geometry. For instance, the outer electrode may be of generally elliptic cylindrical geometry. Other cylindrical geometries may also be envisaged. Preferably, ion flow is symmetric in both directions around the outer electrode.

Further optionally, the outer electrode 400 may be adapted with a temperature controller, for controllably heating and/or cooling the outer electrode 400.

Figure 4B:
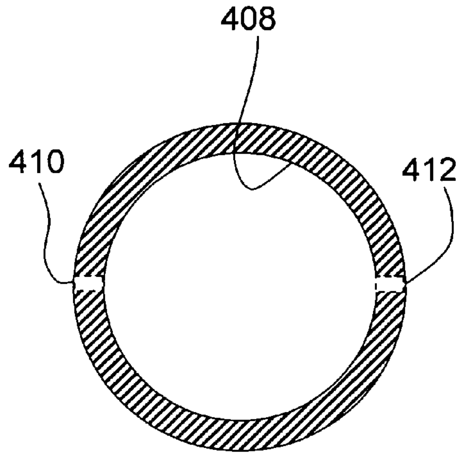
FIG. 4*b* is a simplified cross-sectional end view taken along the line C-C within the medial surface feature of the electrode of FIG. 4*a;*

Referring now to FIG. 4*b,* shown is a simplified cross-sectional end view taken along the line C-C within the medial surface feature of the electrode of FIG. 4*a*. In this specific example, the inner surface of the medial surface feature 408 is circular in cross-section. An ion inlet 410 and an ion outlet 412 are shown defined through facing portions of the medial surface feature 408.

Figure 4C:
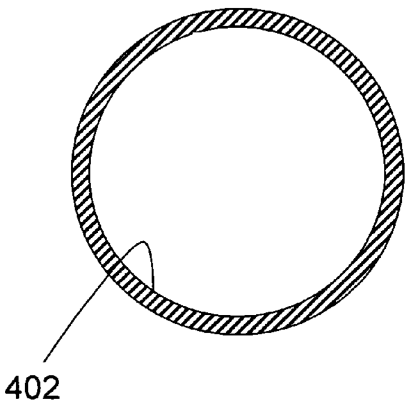
FIG. 4*c* is a simplified cross-sectional end view taken along either one of the lines D-D outside the medial surface feature of the electrode of FIG. 4*a;*

Referring now to FIG. 4*c,* shown is a simplified cross-sectional end view taken along either one of the lines D-D outside the medial surface feature of the electrode of FIG. 4*a*. In this specific example, the inner surface 402 of the outer electrode 400 is circular in cross section.

Figure 5A:
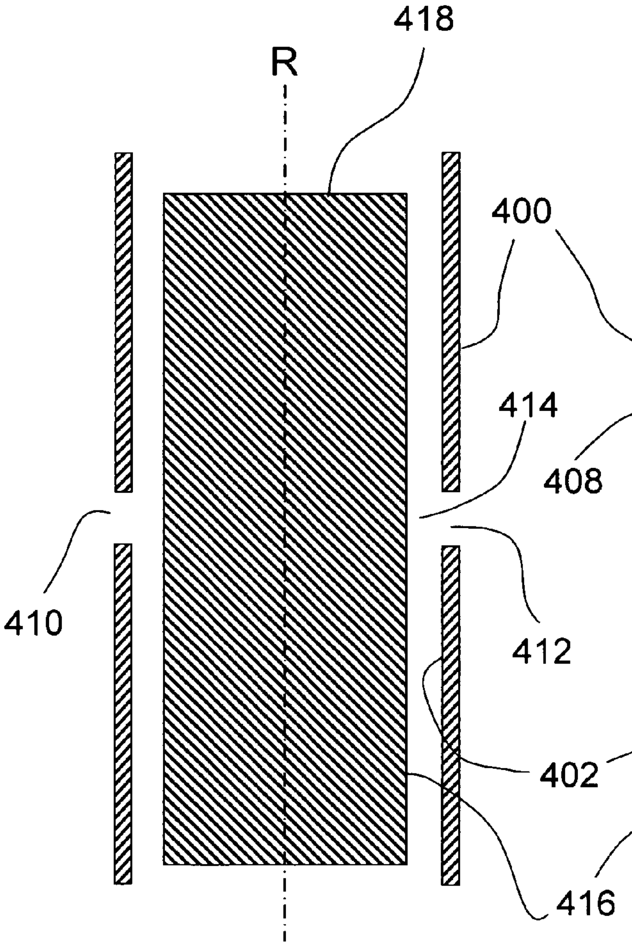
FIG. 5*a* is a simplified cross-sectional side view of a FAIMS electrode assembly including the electrode of FIG. 4*a* and an inner cylindrical electrode, taken within a plane passing through ion inlet and ion outlet orifices defined within the electrode of FIG. 4*a;*

Referring now to FIG. 5*a,* shown is a simplified cross-sectional side view of a FAIMS electrode assembly including the electrode of FIG. 4*a* and an inner cylindrical electrode, taken within a plane passing through ion inlet and ion outlet orifices defined within the electrode of FIG. 4*a*. The ion inlet orifice 410 and the ion outlet orifice 412 of the outer electrode 400 are aligned along the lateral direction with the medial surface feature 408 of outer electrode 400. Ions passing through the ion inlet orifice 410 enter an ion separation region 414 that is defined between the outer surface 416 of inner electrode 418 and the inner surface 402 of outer electrode 400. The ion separation region 414 extends in both directions around the inner electrode 418 to the ion outlet orifice 412. The ion separation region 414 also extends laterally along the inner electrode 418. Ions move through the ion separation region 414 along a defined aggregate direction of ion travel between the ion inlet orifice 410 and the ion outlet orifice 412. More specifically, an aggregate direction of ion travel is defined in both directions around of the inner electrode 418. In order to obtain similar separation results in both directions around the inner electrode 418, the electrode assembly is assembled such that the aggregate direction of ion travel in both directions around the inner electrode 418 are symmetric.

Figure 5B:
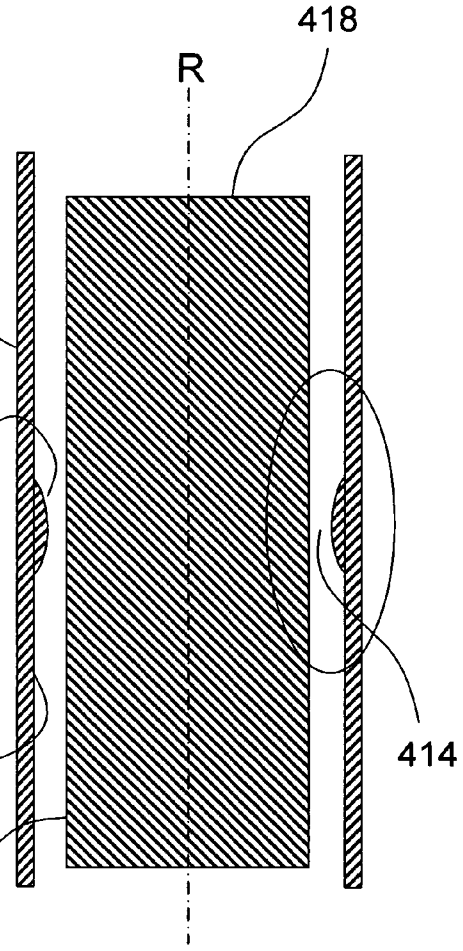
FIG. 5*b* is a simplified cross-sectional side view of the electrode assembly of FIG. 5*a,* after rotation by 90° about the axis "R"

Referring now to FIG. 5*b,* shown is a simplified cross-sectional side view of the electrode assembly of FIG. 5*a,* after rotation by 90° about the axis “R”. FIG. 5*b* illustrates the ion separation region 414 extending around the inner electrode 418.

Referring now to FIGS. 5*a* and 5*b,* it is known that the curved electrode surfaces of the inner electrode 418 and outer electrode 400 result in the formation of electric fields that focus different types of ions at different radial distances between the two electrode surfaces. An ion of interest is focused into a narrow band as a result of an appropriate CV and DV combination being applied to one or more of the inner electrode 418 and the outer electrode 400. This narrow band actually has a thickness, with high ion density near a central region thereof and lower ion density toward either edge. Unfortunately, typically in a side-to-side FAIMS device there is no force acting in opposition to the tendency of the ions to spread out along the lateral direction. This tendency is the result of gas flows, space-charge repulsion, ion-ion repulsive forces, diffusion, etc. Ions that are laterally displaced away from the ion outlet orifice by more than a threshold amount are not detected. Accordingly, ion transmission efficiency is reduced. Advantageously, the medial surface feature 408 in the outer electrode 400 of FIGS. 4*a* through 5*b* focuses ions that are near the edges of the medial surface feature toward the central plane of the medial surface feature. In this context, focusing means directing the ions along the lateral direction in opposition to their tendency to spread out along the lateral direction. In this way, more ions are retained within a portion of the ion separation region 414 that is effectively sampled via the ion outlet orifice 412.

Figure 6:
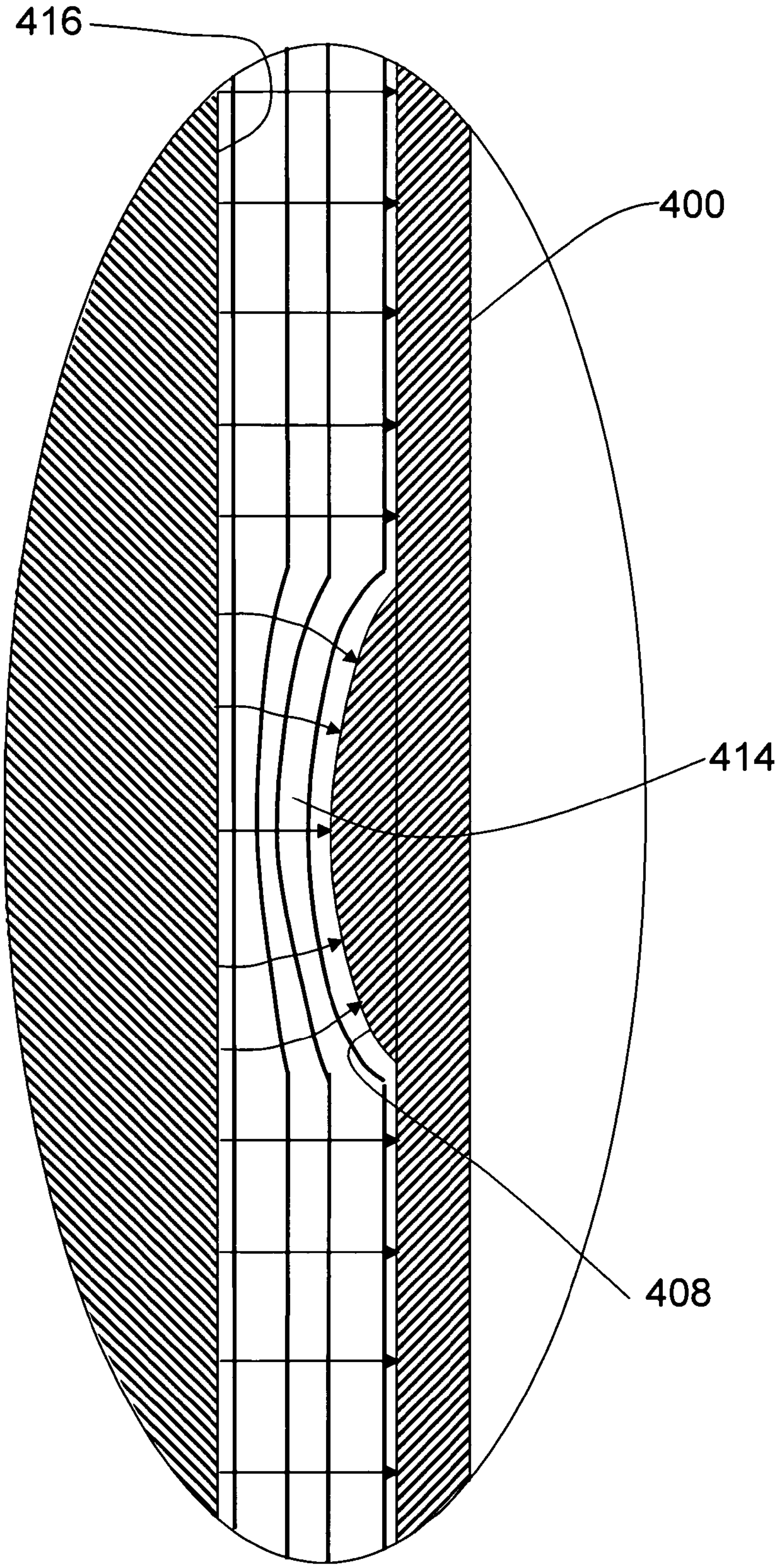
FIG. 6 is a detail view of a portion of the electrode assembly of FIG. 5*b;*

Referring now to FIG. 6, shown is a detail view of a portion of the electrode assembly of FIG. 5*b*. In FIG. 6, the substantially vertical lines are equipotential lines representing the applied voltages between the outer surface 416 of electrode 418 and the inner surface of electrode 400. FIG. 6 is a “snapshot” showing the equipotential lines during, for instance, the high voltage portion of the asymmetric waveform. Points along each equipotential line are at the same potential. During the opposite polarity, low voltage portion of the asymmetric waveform the equipotential lines exhibit the same geometry, the difference being that the values that are assigned to the equipotential lines are different. Electric field lines are shown with closed arrowheads, the electric field lines crossing the equipotential lines at right angles. Of course, during the opposite polarity, low voltage portion of the asymmetric waveform, the direction of the electric field lines simply is reversed.

The electric field that is formed within the portion of the ion separation region 414 adjacent to the medial surface feature 408 acts to focus ions laterally, along a direction toward the central plane of the medial surface feature. Since the central plane of the medial surface feature 408 is laterally aligned with the ion inlet orifice 410 and the ion outlet orifice 412 of the outer electrode 400, some of the ions that otherwise would be lost to collisions with an electrode surface are confined laterally and instead pass through the ion separation region 414 and out through the ion outlet orifice 412.

Figure 7:
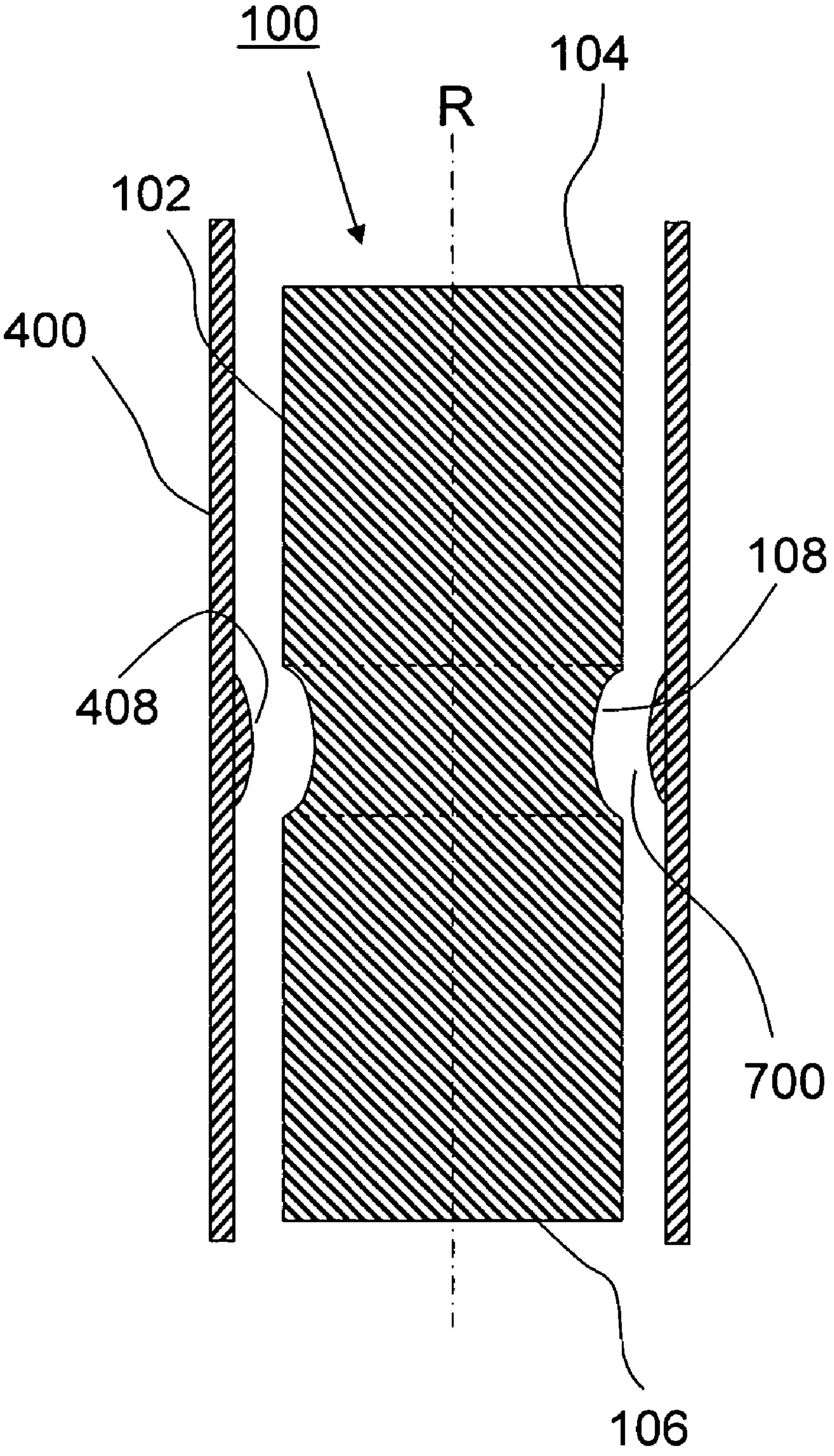
FIG. 7 is a simplified cross-sectional side view of a FAIMS electrode assembly including the outer cylindrical electrode of FIG. 4*a* and the inner cylindrical electrode of FIG. 1*a,* taken within a plane passing through ion inlet and ion outlet orifices defined within the electrode of FIG. 4*a;*

Referring now to FIG. 7, shown is a simplified cross-sectional side view of a FAIMS electrode assembly including the outer cylindrical electrode of FIG. 4*a* and the inner cylindrical electrode of FIG. 1*a,* taken within a plane passing through ion inlet and ion outlet orifices defined within the electrode of FIG. 4*a*. The protruding ridge of the outer electrode 400 is laterally aligned with the recessed channel of the inner electrode 100, for laterally focusing ions within ion separation region 700 and in opposition to the tendency for the ions to spread out.

Figure 8:
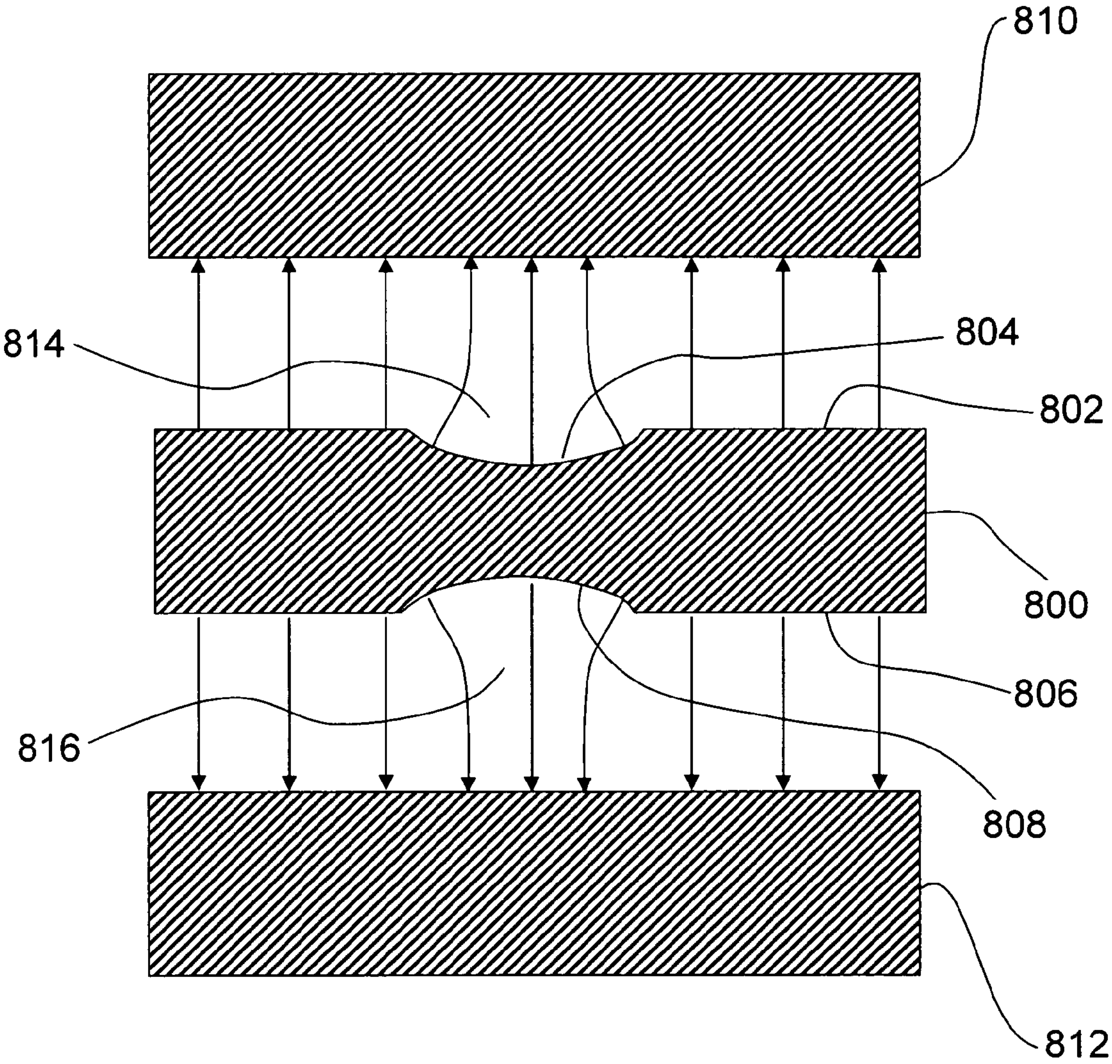
FIG. 8 is a simplified cross-sectional end view of a FAIMS electrode assembly with a stacked-plate geometry, taken in a plane normal to a defined aggregate direction of ion travel and including a central electrode adapted with medial surface features along opposite surfaces thereof according to an embodiment of the instant invention.

Referring now to FIG. 8, shown is a simplified cross-sectional end view of a FAIMS electrode assembly with a stacked-plate geometry, taken in a plane normal to a defined aggregate direction of ion travel and including a central electrode adapted with medial surface features along opposite surfaces thereof according to an embodiment of the instant invention. The electrode assembly shown in FIG. 8 includes three electrode plates, including a central plate 800 having a first surface 802 including a medial surface feature 804 in the form of a recessed channel. The central plate 800 also has a second surface 806 that is disposed on a side of the central plate 800 that is opposite the first surface 802. The second surface 806 includes a medial surface feature 808 in the form of a recessed channel. The electrode assembly further includes an electrode 810 facing the first surface 802 and an electrode 812 facing the second surface 806. FIG. 8 is a view from the end of the electrode assembly, such that a not illustrated ion inlet orifice is disposed above the plane of the page and aligned with the facing end of the central plate 800, and a not illustrated ion outlet orifice is disposed below the plane of the page and aligned with a not illustrated opposite end of the central plate. Ions introduced via the not illustrated ion inlet orifice travel into the page and through one of the ion separation regions 814 and 816 and out through the ion outlet orifice. An aggregate direction of ion travel is defined through both ion separation regions 814 and 816 on opposite sides of the central plate 800, between the not illustrated ion inlet and the not illustrated ion outlet. Also shown in FIG. 8 are electric field lines similar to those shown in FIGS. 3 and 6. For improved clarity, the equipotential lines have been omitted. Of course, during the opposite polarity portion of the asymmetric waveform, the direction of the electric field lines shown in FIG. 8 simply are reversed. The medial surface features 804 and 808 result in lateral focusing of ions within the ion separation regions 814 and 816. This focusing effect opposes the tendency of the ions to spread out along the lateral direction as a result of gas flows, space-charge repulsion, ion-ion repulsive forces, diffusion, etc. within the ion separation regions 814 and 816. In particular, the electric fields that are formed within the portion of the ion separation regions 814 and 816 adjacent to the medial surface features 804 and 808, respectively, act to focus ions laterally, along a direction toward the central plane of the medial surface features 804 and 808. Since the central plane of the medial surface features 804 and 808 are laterally aligned with the not illustrated ion inlet orifice and the not illustrated ion outlet orifice, some of the ions that otherwise would be lost to collisions with an electrode surface are confined laterally and instead pass through the ion separation region 814 or 816 and out through the not illustrated ion outlet orifice.

In an alternative design, two medial surface features are defined along a same surface of the central plate 800. For instance, two recessed channels are defined along the first surface 802 of central plate 800. A first recessed channel is defined along the length of the first surface 802 to one side of the mid-point between the lateral edges of the central plate 800, and a second recessed channel is defined along the length of the first surface 802 to the other side of the mid-point between the lateral edges of the central plate 800. In this way, ions that are introduced via a not illustrated ion inlet orifice divide into two groups, one of which is focused laterally by the first recessed channel and the other of which is focused laterally by the second recessed channel. Optionally, the first and second recessed channels may converge toward a not illustrated ion outlet orifice adjacent the opposite end of the central plate 800, such that the two groups of ions are extracted simultaneously via a same ion outlet orifice.

Figure 9:
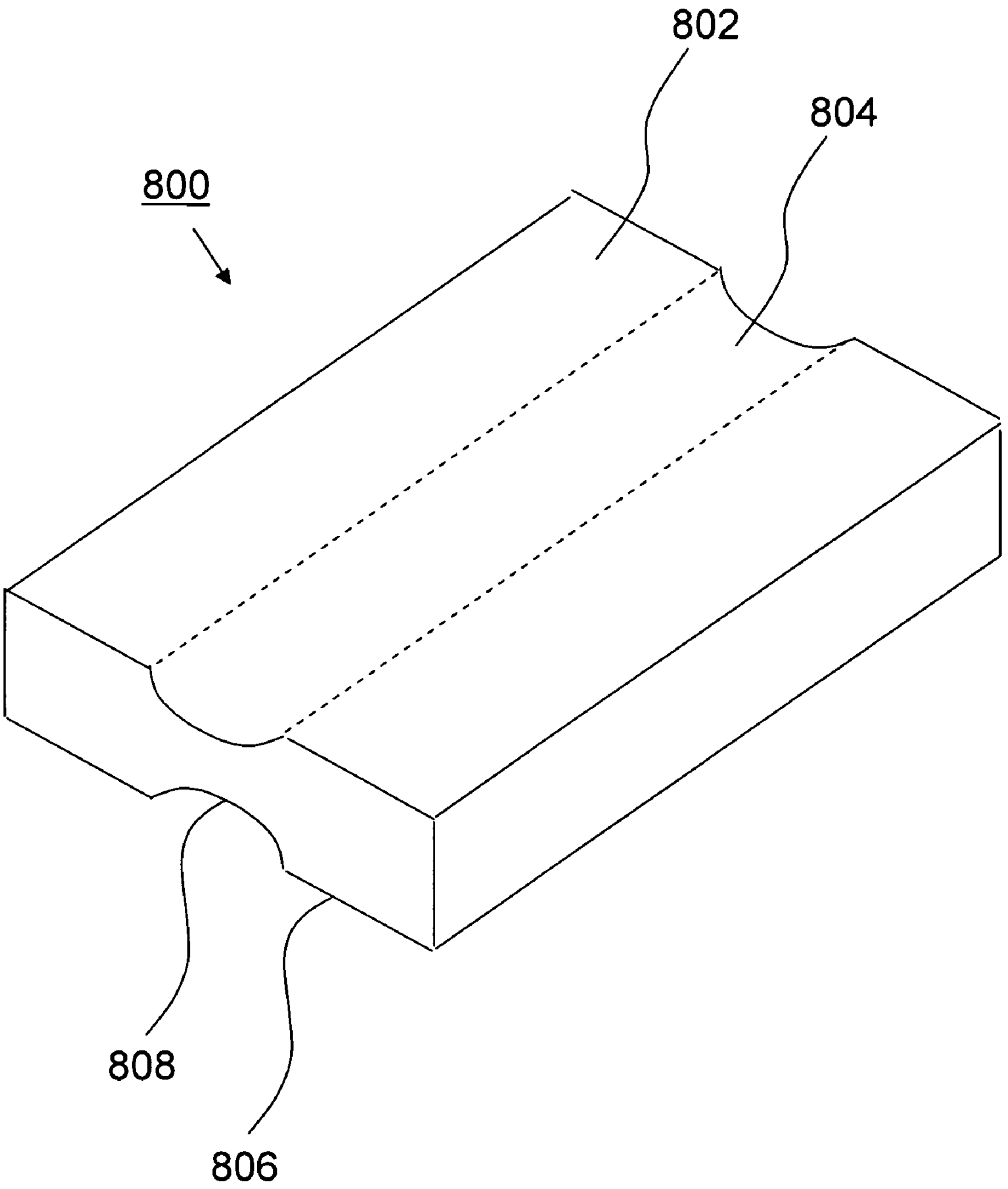
FIG. 9 is a simplified elevational side view of the central electrode of FIG. 8.

Referring now to FIG. 9, shown is a simplified elevational side view of the central electrode of FIG. 8. In the specific and non-limiting example shown in FIG. 9, the central electrode 800 includes a first recessed channel 804 that is preferably smoothly continuous with adjacent portions of a first surface 802, absent a sharp corner therebetween. The central electrode 800 further comprises a second recessed channel 808 that is preferably smoothly continuous with adjacent portions of a second surface 806, absent a sharp corner therebetween. Eliminating sharp corners reduces the chance of electrical discharge occurring between the central electrode 800 and a surface of one of the other electrodes 810 and 812. Optionally, one or both of the ends of the central electrode 800 may be curved along a portion thereof so as to smoothly join the first recessed channel 804 and the second recessed channel 808. Further optionally, the width of the recessed channel 804 and/or 808 may vary along the length of the central electrode 800. By way of a non-limiting example, the width of the recessed channels 804 and 808 decrease along the length of the central electrode 800, between the not illustrated ion inlet orifice and the not illustrated ion outlet orifice. Further optionally, the depth of the recessed channel 804 and/or 808 may vary along the length of the central electrode 800. Further optionally, the central electrode 800 may be provided with a temperature controller for controllably adjusting the temperature of the central electrode 800.

Figure 10:
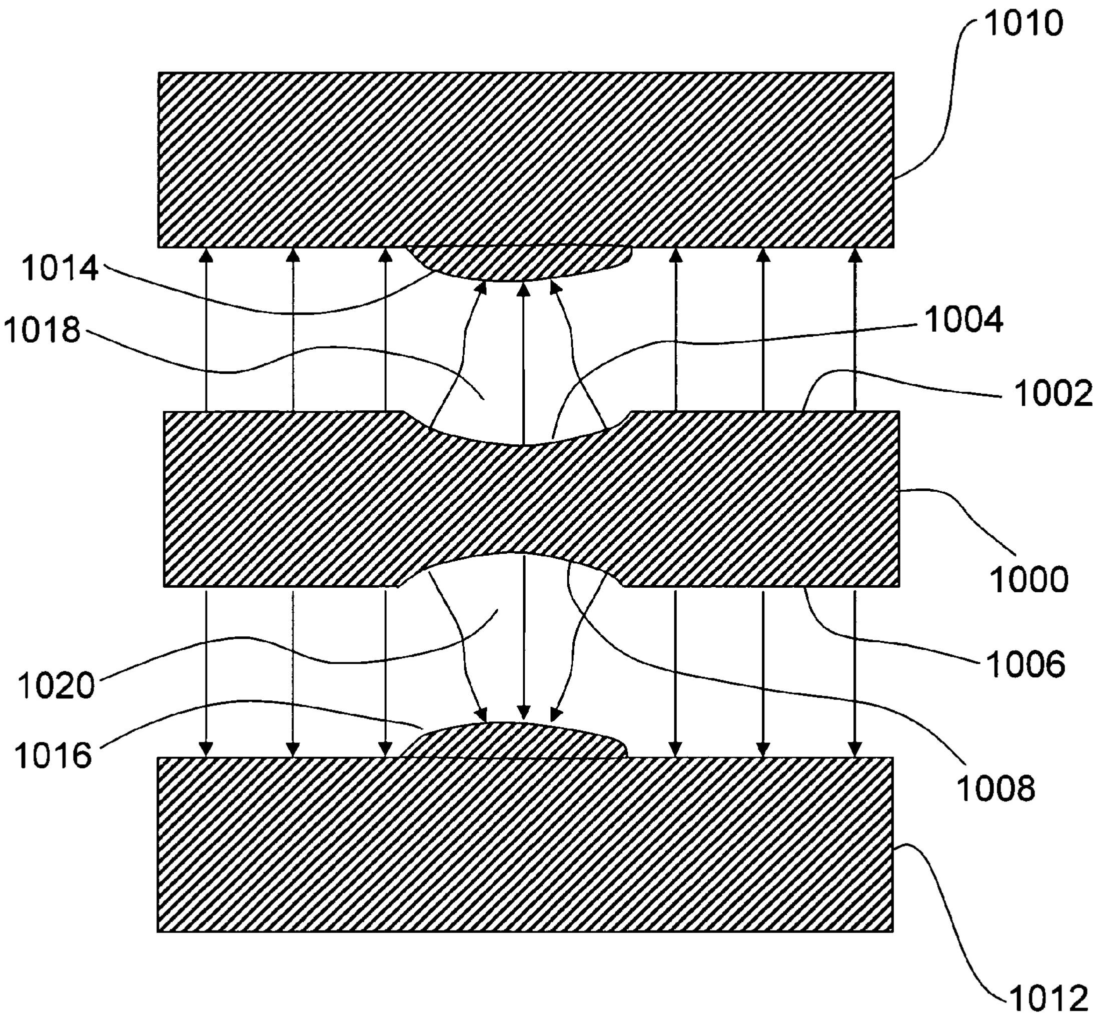
FIG. 10 is a simplified cross-sectional end view of a FAIMS electrode assembly with a stacked-plate geometry, taken in a plane normal to a defined aggregate direction of ion travel and including a central electrode adapted with medial surface features along opposite surfaces thereof and two facing electrodes adapted with medial surface features according to an embodiment of the instant invention.

Referring now to FIG. 10, shown is a simplified cross-sectional end view of a FAIMS electrode assembly with a stacked-plate geometry, taken in a plane normal to a defined aggregate direction of ion travel and including a central electrode adapted with medial surface features along opposite surfaces thereof and two facing electrodes also adapted with medial surface features, according to an embodiment of the instant invention. The central electrode 1000 includes a first recessed channel 1004 that is preferably smoothly continuous with adjacent portions of a first surface 1002, absent a sharp corner therebetween. The central electrode 1000 further comprises a second recessed channel 1008 that is preferably smoothly continuous with adjacent portions of a second surface 1006, absent a sharp corner therebetween. Eliminating sharp corners reduces the chance of electrical discharge occurring between the central electrode 1000 and a surface of one of the facing electrodes 1010 and 1012. Each one of the facing electrodes 1010 and 1012 is adapted with a medial surface feature in the form of a protruding ridge 1014 and 1016, respectively. The protruding ridge 1014 is laterally aligned with the recessed channel 1004 of the central electrode 1000, and the protruding ridge 1016 is laterally aligned with the recessed channel 1008 of the central electrode 1000, for laterally focusing ions within the ion separation regions 1018 and 1020, respectively, in opposition to the tendency for the ions to spread out along the lateral direction.

Figure 11A:
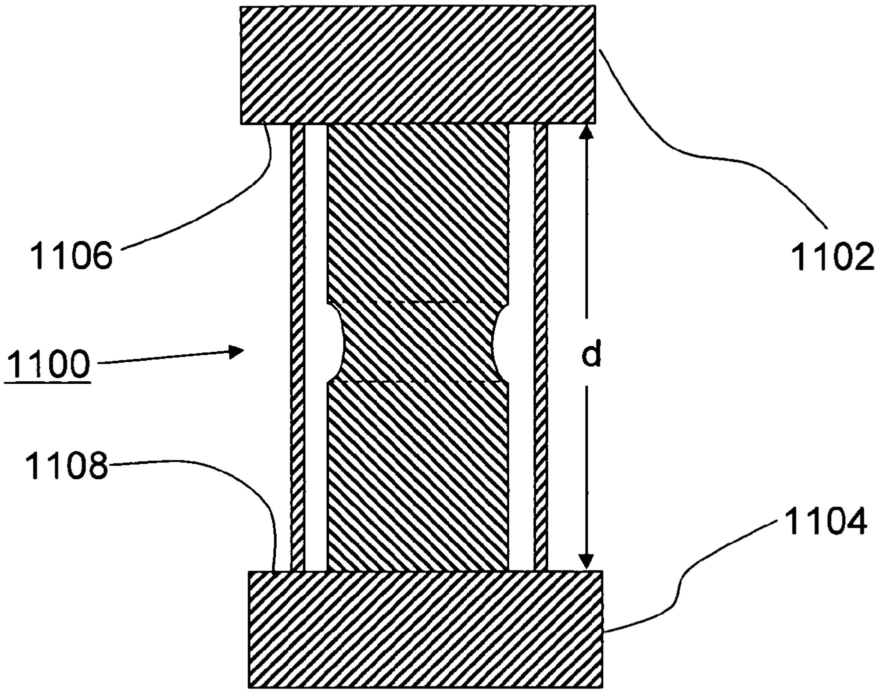
FIG. 11*a* is a simplified cross-sectional side view of a FAIMS electrode assembly of right circular geometry with an inner electrode adapted with a medial surface feature, mounted within electrically insulating support material; and, FIG. 11*b* is a simplified cross-sectional end view of a FAIMS electrode assembly with a stacked-plate geometry, taken in a plane normal to a defined aggregate direction of ion travel and including a central electrode adapted with medial surface features along opposite surfaces thereof.

Referring now to FIG. 11*a,* shown is a simplified cross-sectional side view of a FAIMS electrode assembly of right circular geometry, mounted within electrically insulating support material. FIG. 11*a* includes a representative side-to-side FAIMS device 1100 including cylindrical geometry electrodes. The cylindrical geometry electrodes are mounted at opposite ends thereof into electrically insulating material 1102 and 1104. The electrically insulating material 1102 and 1104 maintains the cylindrical geometry electrodes in a spaced-apart arrangement, electrically isolates one electrode from the other, and forms a substantially gas-tight seal at the lateral boundaries of the ion separation region. In FIG. 11*a,* facing surfaces 1106 and 1108 of the electrically insulating material 1102 and 1104 define the lateral boundaries of the ion separation region. A size of the ion separation region along the lateral direction is denoted "d" in FIG. 11*a.*

Figure 11B:
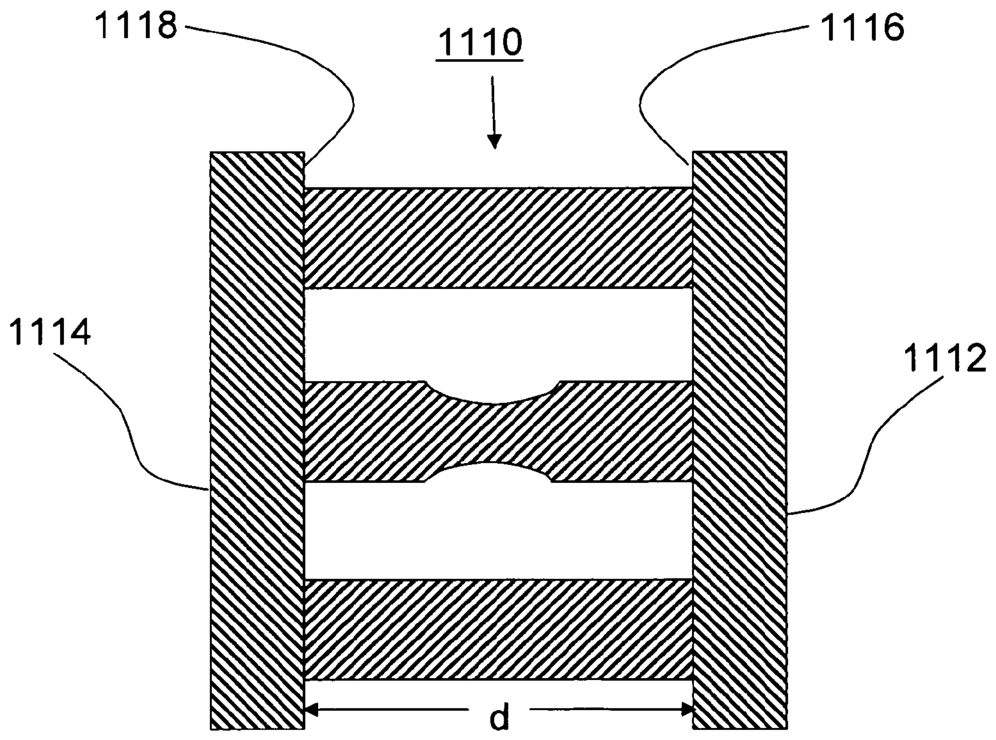

Referring now to FIG. 11*b,* shown is a simplified cross-sectional end view of a FAIMS electrode assembly with a stacked-plate geometry, taken in a plane normal to a defined aggregate direction of ion travel and including a central electrode adapted with medial surface features along opposite surfaces thereof. FIG. 11*b* includes a representative stacked-plate FAIMS device 1110 including plate-shaped electrodes. Optionally a number of plate-shaped electrodes other than three is provided. For instance two plates, five plates, etc. is provided. Further optionally, the plate-shaped electrodes are curved along the lateral direction. Referring again to FIG. 11*b,* the plate-shaped electrodes are mounted at opposite edges thereof into electrically insulating material 1112 and 1114. The electrically insulating material 1112 and 1114 maintains the plate-shaped electrodes in a spaced-apart arrangement, electrically isolates one electrode from the others, and forms a substantially gas-tight seal at the lateral boundaries of the ion separation regions between the plate-shaped electrodes. In FIG. 11*b,* facing surfaces 1116 and 1118 of the electrically insulating material 1112 and 1114 define the lateral boundaries of the ion separation regions between the flat-plate electrodes. A size of the ion separation region along the lateral direction is denoted "d" in FIG. 11*b.*

Numerous other embodiments may be envisaged without departing from the spirit and scope of the invention.

What is claimed is:

1. A FAIMS cell, comprising:

an outer electrode comprising a first electrode surface, the outer electrode being generally cylindrical;

an inner electrode comprising a second electrode surface, the inner electrode being generally cylindrical, the second electrode surface disposed in a spaced-apart facing arrangement relative to the first electrode surface so as to define an ion separation region therebetween, the ion separation region extending along a lateral direction between first and second opposite lateral boundaries thereof, the second electrode surface adapted with a recessed channel extending around the perimeter of the inner electrode and extending along a defined direction of ion travel that is approximately perpendicular to the lateral direction, the recessed channel supporting focusing along the lateral direction of ions traveling through the ion separation region;

a voltage source for applying a radio frequency (RF) asymmetric waveform (DV) and a direct current compensation voltage (CV) to at least one of the outer electrode and the inner electrode; and a protruding ridge extending inwardly from the outer electrode surface toward the inner electrode surface, the protruding ridge spaced-apart from and laterally aligned with the recessed channel.

2. A FAIMS cell according to claim 1, wherein the width of the recessed channel is non-uniform around the perimeter of the inner electrode.

3. A FAIMS cell according to claim 1, wherein the depth of the recessed channel is non-uniform around the perimeter of the inner electrode.

4. A FAIMS cell according to claim 1, wherein the width of the recessed channel at a widest portion thereof is small compared to a distance between the first and second opposite lateral boundaries of the ion separation region.

5. A FAIMS cell according to claim 1, wherein a portion of the second electrode surface adjacent to the recessed channel defines a portion of a right circular cylinder.

6. A FAIMS cell according to claim 1, wherein a portion of the second electrode surface that is adjacent to the recessed channel defines a portion of an elliptic cylinder.

7. A FAIMS cell, comprising:

an inner electrode comprising a first electrode surface, the inner electrode comprising a generally cylindrical electrode body;

an outer electrode comprising a second electrode surface, the outer electrode comprising a second generally cylindrical electrode body, the second electrode surface disposed in a spaced-apart facing arrangement relative to the first electrode surface so as to define an ion separation region therebetween, the ion separation region extending alone a lateral direction between first and second opposite lateral boundaries thereof, the second electrode surface adapted with a protruding ridge extending inwardly from the second electrode surface toward the first electrode surface and extending along a defined direction of ion travel that is approximately perpendicular to the lateral direction, the protruding ridge supporting focusing along the lateral direction of ions traveling through the ion separation region; and a voltage source for applying a radio frequency (RF) asymmetric waveform (DV) and a direct current compensation voltage (CV) to at least one of the inner electrode and the outer electrode.

8. A FAIMS cell, comprising:

a first electrode comprising a first electrode surface;

a second electrode comprising a second electrode surface, the second electrode surface disposed in a spaced-apart facing arrangement relative to the first electrode surface so as to define an ion separation region therebetween, the ion separation region extending along a lateral direction between first and second opposite lateral boundaries thereof, the second electrode surface adapted with a medial surface feature extending along a defined direction of ion travel that is approximately perpendicular to the lateral direction, the medial surface feature supporting focusing along the lateral direction of ions traveling through the ion separation region; and a voltage source for applying a radio frequency (RF) asymmetric waveform (DV) and a direct current compensation voltage (CV) to at least one of the first electrode and the second electrode, wherein the first electrode and the second electrode each comprise a flat plate electrode body.

9. A FAIMS cell according to claim 8, wherein the medial surface feature comprises a recessed channel defined within the second electrode surface and facing the first electrode surface, the recessed channel extending along the aggregate direction of ion travel.

10. A FAIMS cell according to claim 8, wherein the medial surface feature comprises a protruding ridge defined along the second electrode surface and facing the first electrode surface, the protruding ridge extending along the aggregate direction of ion travel.

11. A FAIMS cell, comprising:

an inner electrode having an outer surface comprising a first cylindrical surface portion, a second cylindrical surface portion, and a medial surface feature defined therebetween, the medial surface feature forming a channel around the perimeter of the inner electrode, the channel being recessed with respect to both the first cylindrical surface portion and the second cylindrical surface portion;

an outer electrode having a generally cylindrical inner surface that is disposed in a spaced-apart and facing arrangement relative to the outer surface of the inner electrode for defining an ion separation region therebetween; and, a voltage source for applying a radio frequency (RF) asymmetric waveform (DV) and a direct current compensation voltage (CV) to at least one of the inner electrode and the outer electrode for establishing an electric field therebetween.

12. A FAIMS cell according to claim 11, wherein the medial surface feature is smoothly continuous with the first cylindrical surface portion and with the second cylindrical surface portion, absent a sharp corner therebetween.

13. A FAIMS cell according to claim 11, further comprising a protruding ridge extending from the inner surface of the outer electrode toward the inner electrode, the protruding ridge spaced-apart from and aligned with the medial surface feature when the FAIMS cell is in an assembled condition.

14. A FAIMS cell according to claim 11, wherein the medial surface feature defines an interrupted channel extending symmetrically around the inner electrode in both directions between a first non-recessed portion and a second non-recessed portion.

15. A FAIMS cell according to claim 14, wherein an ion inlet orifice and an ion outlet orifice is defined one each through opposite surface portions of the outer electrode, and wherein first non-recessed portion is facing the ion inlet orifice and the second non-recessed portion is facing the ion outlet orifice when the FAIMS cell is in an assembled condition.

16. A FAIMS cell according to claim 12, wherein the medial surface feature defines an interrupted channel extending symmetrically around the inner electrode in both directions between a first non-recessed portion and a second non-recessed portion.

17. A FAIMS cell according to claim 11, wherein the medial surface feature has a non-uniform width around the perimeter of the inner electrode.

18. A FAIMS cell according to claim 11, wherein the medial surface feature has a non-uniform depth around the perimeter of the inner electrode.

19. A FAIMS cell according to claim 11, wherein the first cylindrical surface portion and the second cylindrical surface portion both define finite portions of a right circular cylinder.

20. A FAIMS cell according to claim 11, wherein the first cylindrical surface portion and the second cylindrical surface portion both define finite portions of an elliptic cylinder.

21. A FAIMS electrode comprising a one-piece electrode body having one of a substantially cylindrical geometry and a substantially flat-plate geometry, the one-piece electrode body having a generally uniform surface contour along a lateral direction that is defined between two opposite edges of the one-piece electrode body, a medial portion of the generally uniform surface contour being one of recessed relative to adjacent portions of the generally uniform surface contour so as to define a channel that is aligned along a defined aggregate direction of ion travel and protruding relative to adjacent portions of the generally uniform surface contour so as to define a ridge that is aligned along the defined aggregate direction of ion travel, the medial portion of the generally uniform surface contour for focusing ions along the lateral direction.

22. A FAIMS cell according to claim 1, comprising at least one electrically insulating support member for supporting the first electrode surface and the second electrode surface in the spaced-apart facing arrangement and for defining the first and second opposite lateral boundaries of the ion separation region.

23. A FAIMS cell according to claim 7, comprising at least one electrically insulating support member for supporting the first electrode surface and the second electrode surface in the spaced-apart facing arrangement and for defining the first and second opposite lateral boundaries of the ion separation region.

24. A FAIMS cell according to claim 7, wherein the width of the protruding ridge is non-uniform around a perimeter of the outer electrode.

25. A FAIMS cell according to claim 7, wherein the height of the protruding ridge is non-uniform around the perimeter of the outer electrode.

26. A FAIMS cell according to claim 8, comprising at least one electrically insulating support member for supporting the first electrode surface and the second electrode surface in the spaced-apart facing arrangement and for defining the first and second opposite lateral boundaries of the ion separation region.

27. A FAIMS cell, comprising:

an inner electrode having an outer surface comprising a first cylindrical surface portion having a first outer diameter, a second cylindrical surface portion having a second outer diameter, and a medial surface portion defined therebetween, the medial surface portion being continuous with the first and second cylindrical surface portions and extending around the perimeter of the inner electrode, the medial surface portion having at least a third outer diameter that is different from either the first or the second outer diameter;

an outer electrode having a generally cylindrical inner surface that is disposed in a spaced-apart and facing arrangement relative to the outer surface of the inner electrode for defining an ion separation region therebetween; and, a voltage source for applying a radio frequency (RF) asymmetric waveform (DV) and a direct current compensation voltage (CV) to at least one of the inner electrode and the outer electrode for establishing an electric field therebetween.

* * * * *